United States Patent

Bonissone et al.

[11] Patent Number: 5,534,766
[45] Date of Patent: Jul. 9, 1996

[54] FUZZY LOGIC POWER SUPPLY CONTROLLER

[75] Inventors: Piero P. Bonissone; Michael J. Schutten; Kenneth H.-C. Chiang, all of Schenectady, N.Y.

[73] Assignee: General Electric Company, Schenectady, N.Y.

[21] Appl. No.: 221,608

[22] Filed: Apr. 1, 1994

[51] Int. Cl.[6] .................................................... G05F 1/10
[52] U.S. Cl. ........................... 323/235; 323/283; 363/98; 363/17
[58] Field of Search .............................. 363/79, 17, 98; 323/283, 235

[56] References Cited

U.S. PATENT DOCUMENTS

| | | | |
|---|---|---|---|
| Re. 33,866 | 3/1992 | Schutten et al. | 363/17 |
| 4,672,528 | 6/1987 | Park et al. | 363/98 |
| 4,951,185 | 8/1990 | Schutten et al. | 363/17 |
| 5,272,428 | 12/1993 | Spiegel et al. | 318/803 |
| 5,291,607 | 3/1994 | Ristic et al. | 395/750 |
| 5,327,355 | 7/1994 | Chiba et al. | 364/483 |
| 5,367,599 | 11/1994 | Okada | 388/809 |
| 5,404,289 | 4/1995 | Hang et al. | 364/148 |

OTHER PUBLICATIONS

"Inherent Overload Protection for Series Resonant Converter" by RJ King, et al, IEEE Transactions on Aerospace and Electronic Systems, vol. AES-19, No. 6, pp. 820–830, Nov. 1983.
"Resonant Power Processors: Part I–State Plane Analysis" by R. Oruganti, et al, Department of Electrical Engineering, Virginia Polytechnic Institute and State University, Blacksburg, Virginia, 1984 IEEE. pp. 860–867.
"Resonant Power Processors: Part II–Methods of Control" by R. Oruganti, et al, Department of Electrical Engineering, Virginia Polytechnic Institute and State University, Blacksburg, Virginia, pp. 868–878, 1984 IEEE.
"A Comparison of Half–Bridge Resonant Converter Topologies" by RL Steigerwald, IEEE, pp. 135–144, 1987.
"Fuzzy Sets" by LA Zadeh, Department of Electrical Engineering and Electronics Research Laboratory, University of California, Berkeley, California, pp. 29–44, 1964.
"Generalized Averaging Method for Power Conversion Circuits", by Seth Sanders, et al, IEEE, pp. 333–340. 1990 CH 2873-8/90/0000-0333.
"Fuzzy Sets for Man–Machine Interaction" by PJ Mac Vicar–Whelan, Int. J. Man–Machine Studies (1976), pp. 687–697.
" A Regulated DC–DC Voltage Source Converter Using a High Frequency Link" by VT Ranganathan, et al, IEEE Trans. on Industry Applications, vol. 1A–18, No. 3, pp. 279–287, May/Jun. 1982.

*Primary Examiner*—Peter S. Wong
*Assistant Examiner*—Shawn Riley
*Attorney, Agent, or Firm*—David C. Goldman; Marvin Snyder

[57] ABSTRACT

The present invention discloses a method and system for controlling a power supply by delivering stable output voltage independent of load. The control system includes a sensor for sensing a state variable, a fuzzy logic controller for generating a control action, and an actuator for regulating the power supply in accordance with the control action. The fuzzy logic controller generates a fuzzy logic knowledge base using low-level fuzzy logic controllers and a mode selector in one embodiment and a fuzzy logic proportional integral controller in another embodiment. The generated fuzzy logic knowledge base is compiled in a look-up table and is used to quickly and efficiently control a power supply device such as a resonant converter.

22 Claims, 6 Drawing Sheets

| dV_ERROR \ V_ERROR | NVL | NL | NM | NS | ZE | PS | PM | PL | PVL |
|---|---|---|---|---|---|---|---|---|---|
| PVL | PVL | NS | NM | NM | NL | NVL | NVL | NVL | NVL |
| PL | PVL | ZE | NS | NM | NM | NL | NL | NVL | NVL |
| PM | PVL | PS | ZE | NS | NM | NM | NM | NL | NVL |
| PS | PVL | PM | PS | ZE | NS | NM | NM | NL | NVL |
| ZE | PVL | PM | PM | PS | ZE | NS | NM | NM | NVL |
| NS | PVL | PL | PM | PM | PS | ZE | NS | NM | NVL |
| NM | PVL | PL | PM | PM | PM | PS | ZE | NS | NVL |
| NL | PVL | PVL | PL | PL | PM | PM | PS | ZE | NVL |
| NVL | PVL | PVL | PVL | PVL | PL | PM | PM | PS | NVL |

RULESET FOR COARSE CONTROLLER

FIG. 4A

| dV_ERROR \ V_ERROR | NVL | NL | NM | NS | ZE | PS | PM | PL | PVL |
|---|---|---|---|---|---|---|---|---|---|
| PVL | ZE | NS | NM | NM | NL | NVL | NVL | NVL | NVL |
| PL | PS | ZE | NS | NM | NM | NL | NL | NVL | NVL |
| PM | PM | PS | ZE | NS | NM | NM | NM | NL | NVL |
| PS | PM | PM | PS | ZE | NS | NM | NM | NL | NVL |
| ZE | PL | PM | PM | PS | ZE | NS | NM | NM | NL |
| NS | PVL | PL | PM | PM | PS | ZE | NS | NM | NM |
| NM | PVL | PL | PM | PM | PM | PS | ZE | NS | NM |
| NL | PVL | PVL | PL | PL | PM | PM | PS | ZE | PS |
| NVL | PVL | PVL | PVL | PVL | PL | PM | PM | PS | ZE |

RULESET FOR FINE CONTROLLER

FIG. 4B

FUZZY LOGIC POWER SUPPLY CONTROLLER

BACKGROUND OF THE INVENTION

1. Field of the Invention

The present invention relates generally to power electronics and more particularly to the control of power supply devices.

2. Description of the Related Art

Power supply devices usually generate, transmit, and distribute power at a fixed switching frequency and output voltage depending upon the application. Most power supplies typically use a converter built on a matrix of semiconductor switches to deliver power at the desired frequency and voltage. One particular class of converters used in high frequency applications is the resonant converter, which is formed using LC resonant tank circuits. The resonant circuit is driven with square waves of current or voltage, and by adjusting the switching frequency around the resonant point, the voltage across the resonant components can be adjusted. By rectifying the voltage across the resonant elements, a regulated DC output voltage is obtained which can be different than the input DC voltage to the converter. Other advantages are that the resonant converter operates in a zero-voltage or a zero-current switching mode and reduces electromagnetic interference.

While resonant converters exhibit the above advantages, they suffer from the disadvantage of being difficult to control because of the non-linearity associated with its resonant elements and rectifier circuitry. One particular type of approach to controlling a resonant converter has been to use a linear proportional-integral-derivative (PID) controller. However, the linear controller decreases the electrical performance of the resonant converter significantly. Other control approaches have used non-linear controllers. Examples of non-linear controllers are shown in Oruganti et al., *Resonant Power Processors*, Part II, IEEE Industrial Applications Society, 1461–1471 (1984); King et al. *Inherent Overload Protection for the Series Resonant Converter*, IEEE Transactions on Aerospace Electronic Systems, 820–830 (1983); Ranganathan et al., *A Regulated DC-DC Voltage Source Converter Using A High Frequency Link*, IEEE Industrial Applications Society, 279–287 (1982); Sanders et al., *Generalized Averaging Method For Power Conversion Circuits*, IEEE Power Electronics Specialists Conference, 273–290 (1989); Schwarz, An Improved Method of Resonant Current Pulse Modulation For Power Converters, IEEE Power Electronics Specialists Conference, 194–204 (1975). The above non-linear controllers are complex, require expensive sensors for operation, and have wide variations in stability margin, overshoot, rise time, output ripple, and transient response.

SUMMARY OF THE INVENTION

In order to avoid the problems associated with the above-mentioned controllers, the present invention uses a fuzzy logic controller in a closed loop control system to drive the resonant converter to deliver stable output voltage independent of input line and output load variations. The fuzzy logic controller of the present invention is inexpensive, obtains good electrical performance, does not require the use of expensive sensors, and has increased robustness in the face of changing circuit parameters, saturation effects, or external disturbances.

Therefore, it is a primary objective of the present invention to provide a power supply controller that provides good transient and steady state response without requiring the use of expensive sensors.

Another object of the present invention is to provide a power supply controller that delivers constant voltage or power (depending upon system level requirements) regardless of parameter variations, line, and load changes, or other disturbances.

Still another object is to use a fuzzy logic controller for generating fast-responding control actions to provide real-time control of a power supply.

Thus, in accordance with the present invention, there is provided a fuzzy logic power supply controller for controlling a power supply in which a sensor means senses state variable(s) defined for the power supply and an actuator means provides a control action to the power supply. The fuzzy logic power supply controller includes a generating means for generating a fuzzy logic knowledge base defined for the sensed state variable(s). A compiled look-up table of control action responses is derived from executing the fuzzy logic knowledge base for the sensed state variable(s). An address producing means produces an address in the look-up table for the sensed state variable(s). A reading means reads the look-up table corresponding to the produced address and outputs the control action response to the actuator means.

While the present invention will hereinafter be described in connection with a preferred embodiment and method of use, it will be understood that it is not intended to limit the invention to this embodiment. Instead, it is intended to cover all alternatives, modifications and equivalents as may be included within the spirit and scope of the present invention as defined by the appended claims.

BRIEF DESCRIPTION OF THE DRAWINGS

FIGS. 4a–4b are rule sets for the series resonant converter;

DETAILED DESCRIPTION OF THE PRESENT INVENTION

Figure 1:
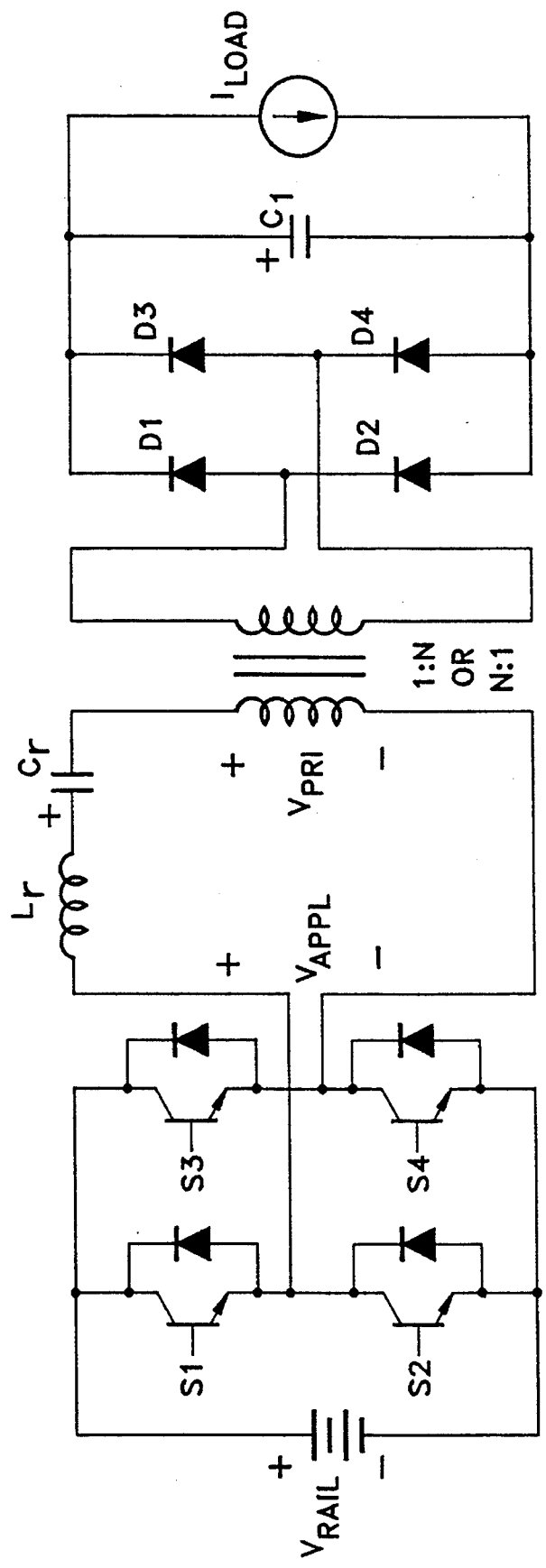
FIG. 1 is a circuit diagram of a series resonant converter.

FIG. 1 shows a circuit diagram of a single resonant converter (SRC) 10 used in the present invention. The SRC includes a DC voltage source $V_{rail}$, semiconductor switches S1–S4 (i.e. BJT, FET, MOSFET) for applying a voltage $V_{appl}$ to resonant tank elements $L_r$ and $C_r$, a 1:N transformer for increasing or a N:1 transformer for decreasing a voltage $V_{pri}$, a full bridge rectifier (D1–D4) for rectifying the voltage $V_{pri}$, a filter capacitor $C_f$, and an output load $I_{load}$ which may be a device such as a x-ray generator, a satellite power supply, a radar power supply, a lighting supply, or the like. The SRC and its operation is described in further detail in commonly assigned U.S. Pat. No. RE 33,866 reissued on Mar. 31, 1992, which is incorporated herein by reference. In the present invention, the semiconductor switches S1–S4 operate the SRC in one of two modes; always below the resonant tank natural frequency (sub-resonant) or above the natural frequency (super-resonant). The control strategy for the SRC in the preferred embodiment is described in reference to the super-resonant mode, although a similar control strategy could be designed for the SRC operating in the subresonant mode. In accordance with the superresonant mode, it is necessary to maintain a control frequency $F_c$ that is restricted to values above the circuit's resonant frequency $F_r$, so as $F_c$ is lowered towards the resonant frequency $F_r$, the amount of energy available to the output capacitor $C_f$ increases, resulting in a higher output voltage at the output capacitor.

Figure 2:
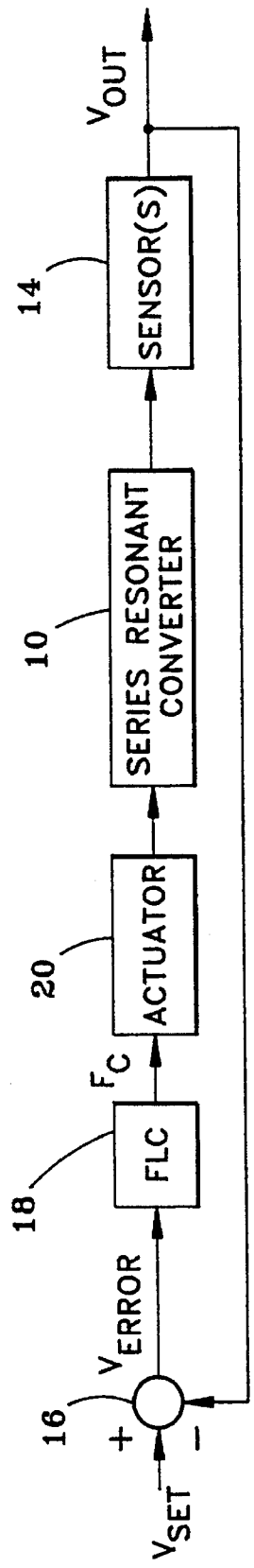
FIG. 2 is a block diagram of a control system for a series resonant converter.

In the present invention, the SRC is controlled by a fuzzy logic control system 12 as shown in FIG. 2. The fuzzy logic control system includes a sensor 14 for sensing a state variable (i.e. output voltage), a summer 16 for comparing the sensed state variable to a reference setpoint, a fuzzy logic controller 18 for generating a control action value in response to the sensed state variable, and an actuator 20 for regulating the SRC in accordance with the control action value generated from the fuzzy logic controller. In particular, the sensor senses the output voltage $V_{out}$ from the SRC and sends it to the summer along with the reference set point voltage $V_{set}$, which generates an error signal $V_{error}$ ($V_{set}$–$V_{out}$). $V_{error}$ is then inputted to the fuzzy logic controller which generates a control action response value proportional to the control frequency $F_c$, by executing a fuzzy logic knowledge base defined for $V_{out}$. The control action response value $F_c$ is sent to the actuator which regulates the SRC in accordance with the control action.

The use of fuzzy logic in a closed loop control system is well known in the art. Background information on fuzzy logic and fuzzy logic control is disclosed in commonly assigned co-pending U.S. patent application Ser. No. 07/775,873 filed on Oct. 15, 1991, which is incorporated herein by reference. The fuzzy logic controller 18 of the present invention is shown in more detail in FIG. 3. The fuzzy logic controller is a hierarchical controller which includes low level controllers 22 and 24. Each of the controllers receive control variables $V_{error}$ and $dV_{error}$ and derives a control action response value therefrom. The control variable, $dV_{error}$, is generated by inputting the $V_{error}$ into a delay element (i.e. a sample and hold) 26 and a summer 28 which takes the difference between the current $V_{error}$ value and a previous value of $V_{error}$ to arrive at $dV_{error}$. The control action value generated from both the low-level controllers 22 and 24 controls the change in control frequency $dF_c$. A mode selector 30 blends the control action values ($dF_c$) from the low-level controllers with $V_{error}$ into a single control action value $dF_c$ which is the change in the control frequency $F_c$. Once the mode selector has blended the outputs from the low-level controllers 22 and 24 into a single control action value $dF_c$, the output $dF_c$ is then added in a summer 32 with a previous $F_c$ value stored in a delay element (i.e. a sample and hold) 34 to provide a new control frequency $F_c$. The overall sum generated by the summer 32 is indicative of whether $F_c$ should be increased or decreased. For example, if $dF_c$ is zero (i.e. steady state), then $F_c$ is maintained at its previous value. However, if $dF_c$ is a positive value, then $F_c$ is increased accordingly. Conversely, if $dF_c$ is a negative value, then $F_c$ is decreased accordingly. In order to stay within the above-mentioned control strategy (i.e. superresonant), the control frequency $F_c$ must be greater than the natural frequency of the resonant converter while remaining below a maximum practical switching frequency. Thus, $F_c$ must be clamped between a minimum and a maximum value before being passed to the actuator 20.

In the preferred embodiment, the low-level controllers 22 and 24 are proportional integral controllers, with the low-level controller 22 being a coarse proportional integral controller and the low-level controller 24 being a fine proportional integral controller. A coarse and fine proportional integral controller are configured by adjusting the scaling factors, membership function, and rule sets. Background information on fuzzy logic proportional integral controllers is disclosed in commonly assigned co-pending U.S. patent application Ser. No. 07/909,290 filed on Jul. 6, 1992, which is incorporated herein by reference. Both the coarse and fine proportional integral controller contain a collection of input and output term sets and a rule set relating those term sets to the electrical performance of the SRC. In particular, the control variables $V_{error}$, $dV_{error}$, and $dF_c$, are placed in a rule set as shown in FIGS. 4a–4b, respectively. Each rule set provides a distribution for the output $dF_c$ defined for input variables $V_{error}$ and $dV_{error}$. In both FIGS. 4a–4b, control variables $V_{error}$ and $dV_{error}$ have been partitioned into nine fuzzy sets: negative very large (NVL); negative large (NL); negative medium (NM); negative small (NS); zero (ZE); positive small (PS); positive medium (PM); positive large (PL); and positive very large (PVL). It is important to note that although $V_{error}$ and $dV_{error}$ have the same labels, they are defined over different universes of discourse, so that the membership functions for the reference fuzzy sets are not necessary identical.

In the preferred embodiment, the coarse proportional integral controller 22 is used to specifically reduce $V_{error}$ at a rapid rate while the fine proportional integral controller 24 is used to reduce steady state error to acceptable values. Thus, as shown in the shaded regions of FIG. 4a, the rule set of the coarse controller has two regions of large control action regardless of $dV_{error}$. So, if the value of $V_{error}$ is a positive very large (PVL) value and the value of $dV_{error}$ is positive very large (PVL), then the control action value for $dF_c$ is a negative very large (NVL) value. On the other hand, the rule of the fine controller is similar to that of a MacVicar-Whelan rule set, where step-like gradations are synthesized to reduce steady state error. For example, a negative medium (NM) value for $V_{error}$ and a positive small (PS) value for $dV_{error}$ results in a positive small (PS) control action value for $dF_c$.

Figure 5:
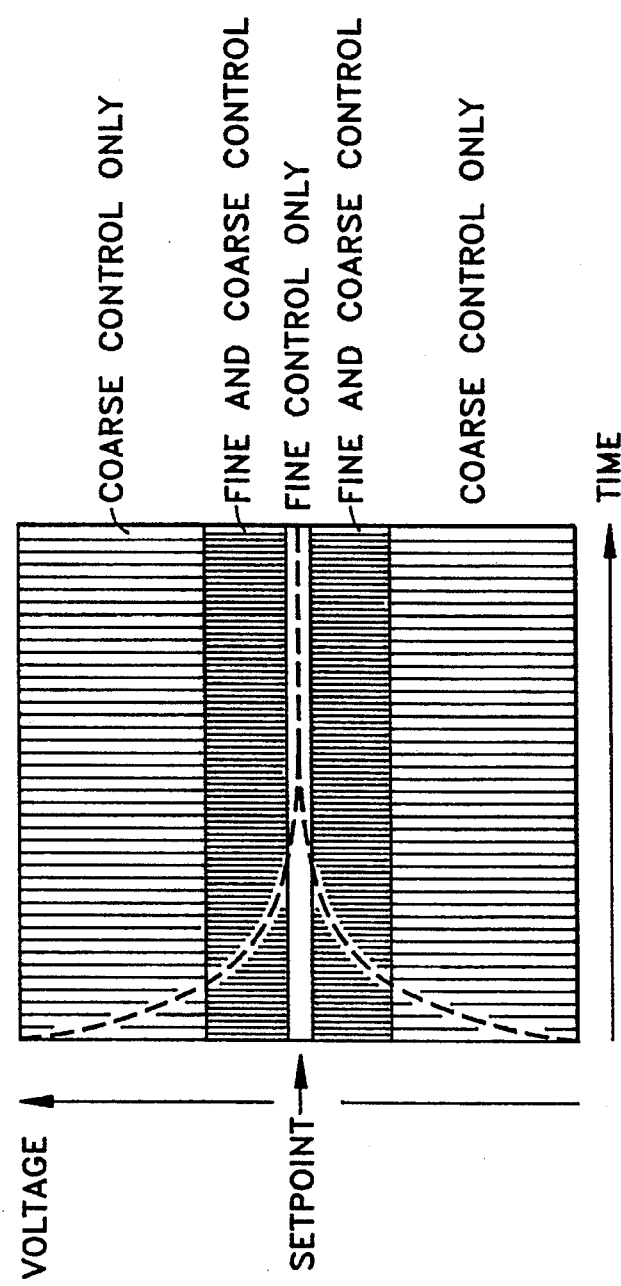
FIG. 5 is a graph illustrating the operation of the fuzzy logic controller for the series resonant converter.

The mode selector 30 receives $dF_c$ values from both the coarse controller 22 and the fine controller 24 and blends their outputs in accordance with the $V_{error}$. The operation of the mode selector is shown in FIG. 5. For an output voltage that is far removed with respect to the voltage setpoint, the mode selector selects the $dF_c$ generated from the coarse controller as the control action. As the output voltage moves closer to the voltage setpoint, the mode selector weights the outputs from both the coarse and fine controllers and outputs a single control action value that is a blend of both controllers. Typically, as the output voltage moves closer to the voltage setpoint, the mode selector lowers the weight of the coarse controller and increases the weight of the fine controller so that the control action value $dF_c$ is dominated by the value generated from the fine controller. When the output voltage is within a small percentage of the voltage setpoint, the coarse controller is fully disabled and the fine controller is used to reduce $V_{error}$.

Figure 6:
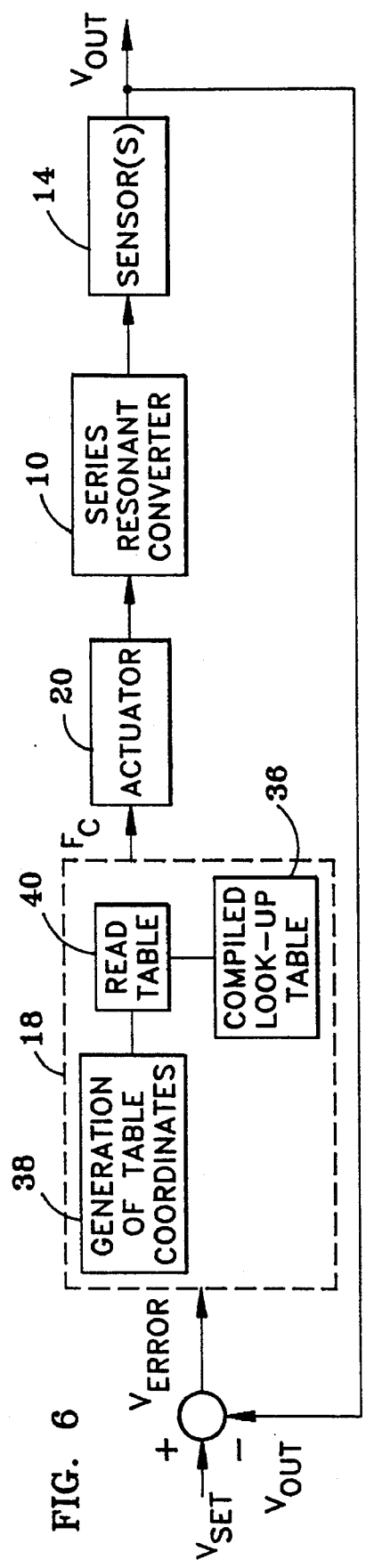
FIG. 6 is a block diagram of a compiled fuzzy logic controller.

After the fuzzy logic knowledge base has been derived for both of the low-level controllers 22 and 24, their respective control action response values are compiled into a compiled look-up table 36 as shown in FIG. 6. In addition to the compiled look-up table, there is a means for producing an address 38 in the look-up table for the state variable sensed from the sensor 14 and a reader means 40 for reading the look-up table corresponding to the generated address and outputting the control action to the actuator 20 which adjusts the SRC in accordance with the control action. For each time step, the sensor 14 detects a value of $V_{out}$ and calculates corresponding values for $V_{error}$ and $dV_{error}$. The resulting values for $V_{error}$ and $dV_{error}$ are mapped to a particular value of $dF_c$ which is stored in the look-up table 36. After $V_{error}$ and $dV_{error}$ have been calculated, the address producing means 38 produces an address in the look-up table 36 that contains the corresponding output value for $dF_c$. Then the reader means 40 reads and outputs the control action value to the actuator 20 which adjusts the SRC accordingly. In the present invention, the look-up table is preferably a memory device and the address producing means 38 and the reader means 40 are preferably a microprocessor or a microcontroller.

To establish the look-up table 36, a state space is divided into partitions which are defined as the intersection of term sets (see FIGS. 4a–4b). Partitions may be divided using any defuzzification technique such as a mean of maxima defuzzification technique or an approximate height method defuzzification technique. Using these defuzzification techniques, outputs can be generated from executing corresponding rules in the partitions. Next, the outputs are stored in locations in a memory corresponding to the respective partitions. The use of the look-up table, the address producing means, and the reader means obviates the need for a knowledge base and an interpreter as disclosed in conventional fuzzy logic controllers. Use of an interpreter requires a continuous evaluation of all the rules in the knowledge base every time that there is a change in the input. However, by compiling the control action values into a look-up table, a simple relationship is developed between the controller input and the controller output. For example, for a given input, $V_{error}$ and $dV_{error}$, there will be a resulting control action value $dF_c$ for that input. Thus, there is no need to execute all the rules during run-time, because all of the rules have been executed and compiled into the look-up table. All that is required in the present invention is the input values and the respective output value for the given inputs. The advantages of this configuration are that a simple processor can use the look-up table faster with very little memory being used and this configuration can be used in applications having throughput requirements in the range of 1 to 10 us. Further background information on the look-up table 36, the address producing means 38, and the reader means 40 are disclosed in detail in U.S. patent application Ser. No. 07/775,873.

Figure 7:
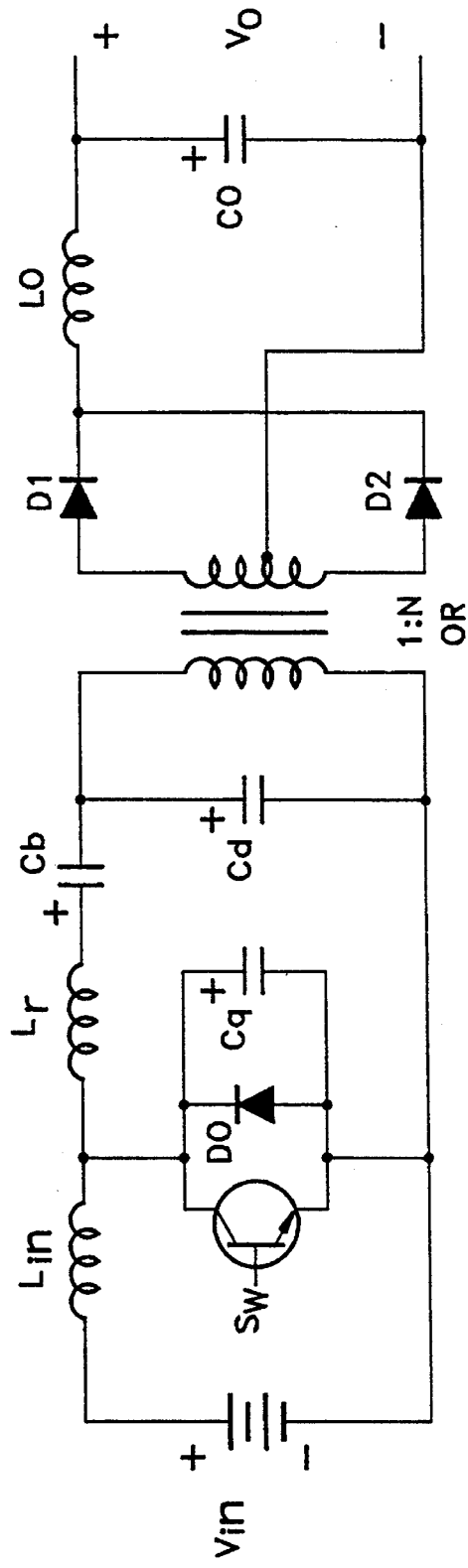
FIG. 7 is a circuit diagram of a single ended parallel multi resonant converter.

In another embodiment of the present invention, a fuzzy logic controller 46 is used to control a single ended parallel multi resonant converter (SEPMRC) 42 as shown in FIG. 7. In the SEPMRC circuit, a voltage source Vin applies a sinusoidal voltage through inductor Lin to resonant elements inductor Lr and capacitor Cd. A switching element Sw connected in parallel to diode D0 and capacitor Cq delivers the sinusoidal component of current to the resonant elements in accordance with its "on time" and "off time". A blocking capacitor Cb blocks the DC voltage component of the sinusoidal voltage as it is applied to a 1:N or a N:1 transformer. The voltage at the transformer is rectified by rectifier diodes D1–D2. The rectified voltage is applied to inductor Lo and capacitor Co which act as a low pass filter for maintaining a low ripple DC output voltage at $v_o$. The output voltage $v_o$ of the SEPMRC is regulated by controlling the "on time" $T_{on}$ of the switching element (Sw in parallel with D0 and Cq). As the "on time" $T_{on}$, of the switch increases, the peak voltage across the switch increases. The SEPMRC operates in the superresonant mode, so continuing to increase the frequency of $T_{on}$ above resonance will reduce the output voltage $v_o$ for a constant input voltage and output load and the output voltage $v_o$ will increase if switching frequency decreases towards resonance, for constant input voltage and output load.

Figure 3:
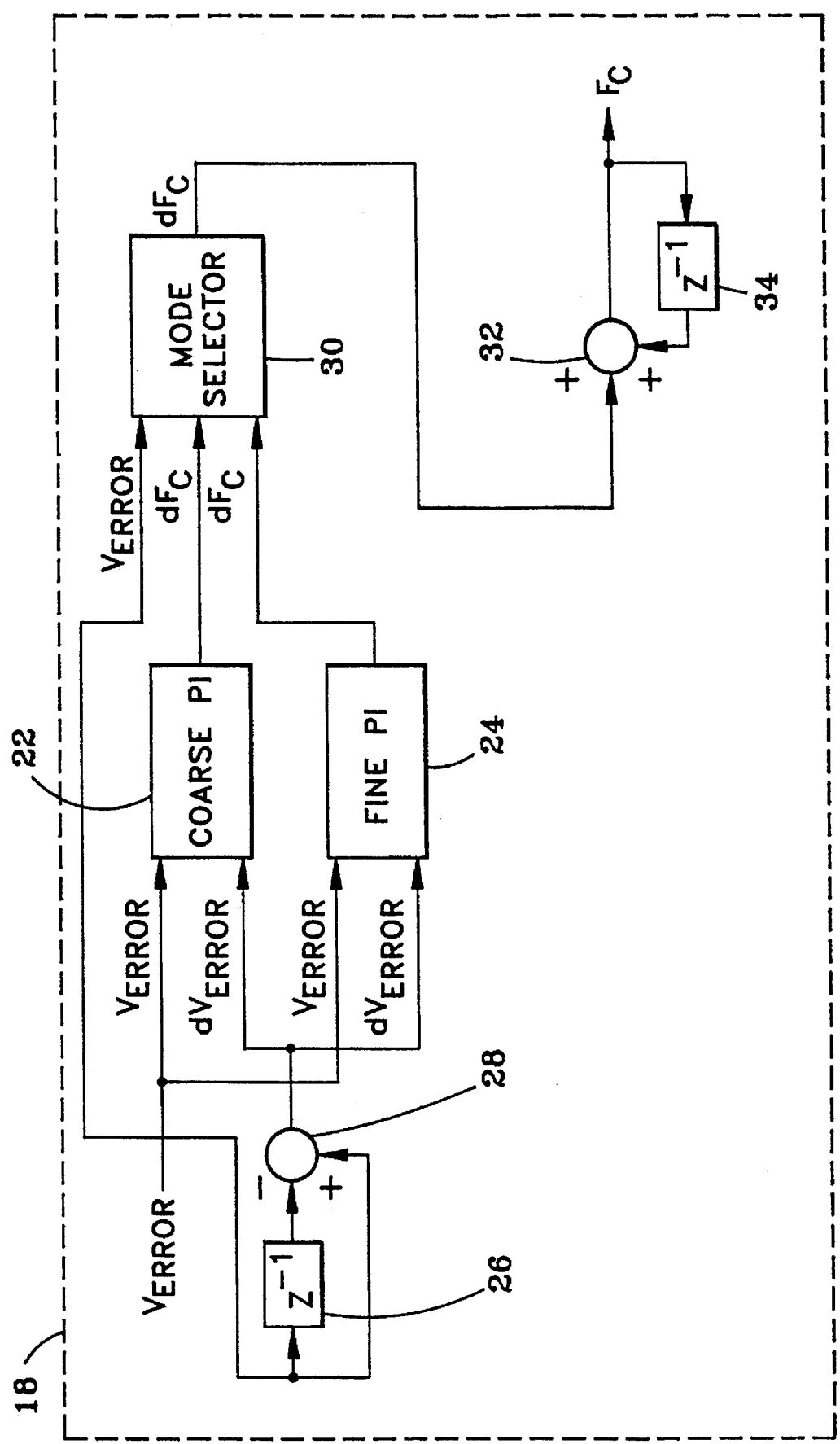
FIG. 3 is a schematic of a fuzzy logic controller for the series resonant converter.
Figure 8:
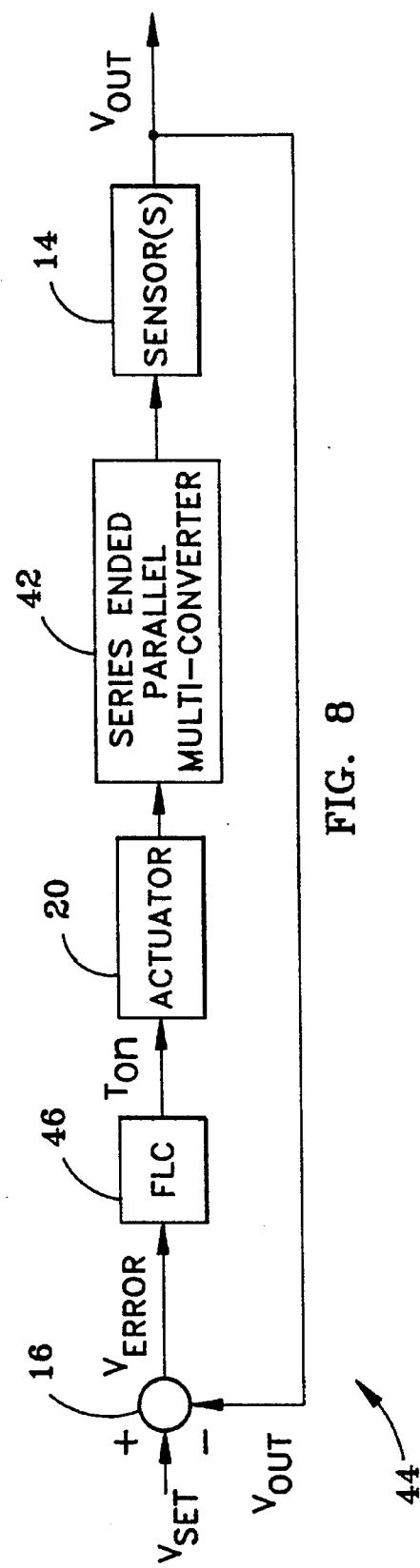
FIG. 8 is a block diagram of a control system for a single ended parallel multi resonant converter.

FIG. 8 is a block diagram of a fuzzy logic control system 44 for the SEPMRC. The control system is analogous to the system described for the SRC except that this controller is a variable frequency controller governing the switch "on time" $T_{on}$. In addition, the fuzzy logic controller 46 is a proportional integral controller whereas the fuzzy logic controller in FIG. 3 is a hierarchical controller with low-level controllers and a mode selector. The fuzzy logic controller 46 is shown in more detail in FIG. 9. The fuzzy logic controller 46 includes a fuzzy logic proportional integral (PI) controller 48, a delay element (i.e. a sample and hold) 50, and a summer 52. The PI controller receives $V_{error}$ and $dV_{error}$ as control variable inputs. The control variable, $dV_{error}$ is generated by inputting the $V_{error}$ into the delay element 50 and the summer 52 wherein the difference between the current $V_{error}$ value and a previous value of $V_{error}$ stored in the delay element are used to arrive at $dV_{error}$. The control action value generated from the proportional integral controller 48 relates to the change in "time on" $dT_{on}$. The fuzzy logic controller 46 can also use additional state information such as the current through Lo and the voltage and current in the resonant and blocking elements. The fuzzy logic controller has the advantage of being able to usefully process information for inexact (i.e. low cost) voltage and current sensors. Use of these sensors with a fuzzy logic controller provides high electrical performance using low cost sensors.

Figures 9, 10:
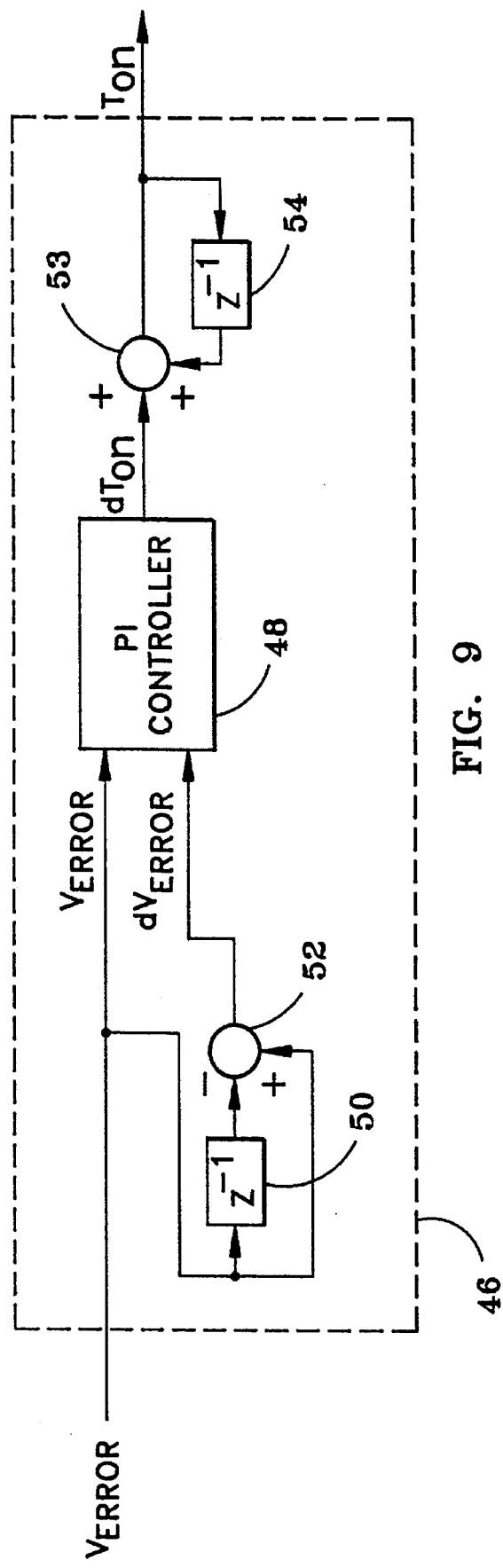
FIG. 9 is a schematic of a fuzzy logic controller for the single ended parallel multi resonant converter.
FIG. 10 is a rule set for the single ended parallel multi resonant converter.

The PI controller 48 contains a collection of input and output term sets and a rule set relating those term sets to the electrical performance of the SEPMRC. In particular, the control variables $V_{error}$, $dV_{error}$, and $dT_{on}$ are placed in a rule set as shown in FIG. 10. Like the rule sets in FIGS. 4a–4b, the rule set in FIG. 10 provides a distribution for the output $dT_{on}$ defined for input variables $V_{error}$ and $dV_{error}$. In FIG. 10, the three control variables have been partitioned into seven terms: negative large (NL); negative medium (NM); negative small (NS); zero (ZE); positive small (PS); positive medium (PM); and positive large (PL). So, for a PL $dV_{error}$ input value and a PS $V_{error}$ input value, the proportional integral controller would generate a PL $dT_{on}$ output value. The output, $dT_{on}$, from the proportional integral controller 48 is added in a summer 53 with a previous value of $T_{on}$ stored in a delay element (i.e. a sample and hold) 54 to provide a new control value $T_{on}$ which is passed to the actuator 20 which regulates the SEPMRC in accordance with the control action value. The overall sum generated by the summer 53 is indicative of whether $T_{on}$ should be increased or decreased. For example, if $dT_{on}$ is zero (i.e. steady state). then $T_{on}$ is maintained at its previous value. However, if $dT_{on}$ is a positive value, then $T_{on}$ is increased accordingly. Conversely, if $dT_{on}$ is a negative value, then $T_{on}$ is decreased accordingly. In order to stay within the control strategy, $T_{on}$ is clamped between a minimum and a maximum value before being passed to the actuator.

After the proportional integral controller 48 has derived the fuzzy logic knowledge base, the respective control action values are compiled into a look-up table as shown in FIG. 6 and used in a similar manner as described earlier. Thus, each time the $V_{error}$ and $dV_{error}$ are calculated from the sensor 14, the resulting values are used to locate the corresponding $dT_{on}$ value in the compiled look-up table and integrated to $T_{on}$ and outputted to the actuator 20.

It is therefore apparent that there has been provided in accordance with the present invention, a method and system for controlling a power supply that fully satisfy the aims and advantages and objectives hereinbefore set forth. The invention as been described with reference to several embodiments. However, it will be appreciated that variations and modification can be effected by a person of ordinary skill in the art without departing from the scope of the invention.

We claim:

1. A fuzzy logic power supply controller for controlling a power supply in which a sensor means senses at least one state variable defined for the power supply and an actuator means provides a control action to the power supply, the controller comprising:

means for generating a fuzzy logic knowledge base having a plurality of fuzzy rules defined for the at least one sensed state variable;

a compiled look-up table of control action response values derived from executing the fuzzy rules in the fuzzy logic knowledge base for the at least one sensed state variable, wherein the compiled look-up table of control action response values obviates a need for subsequent execution of the fuzzy rules;

means for producing addresses in the compiled look-up table for the at least one sensed state variable, wherein the addresses point to locations in the compiled look-up table where the control action response values are stored; and means for reading the compiled look-up table corresponding to the generated addresses and outputting the control action response values to the actuator.

2. A control system according to claim 1, wherein the generating means is a fuzzy logic controller.

3. A control system according to claim 2, wherein the fuzzy logic controller includes means for receiving a plurality of control variables based upon the at least one sensed state variable and means for outputting a control action value based on the plurality of control variables therefrom.

4. A control system according to claim 3, wherein the fuzzy logic controller is a fuzzy logic proportional integral controller.

5. A control system according to claim 4, wherein the power supply is a single ended parallel multi resonant converter.

6. A control system according to claim 2, wherein the fuzzy logic controller includes a plurality of low-level controllers, each receiving a plurality of control variables based upon the sensed state variable and outputting a control action value therefrom and a mode selector for blending the control action values from the plurality of low-level controllers into a single control action value.

7. A control system according to claim 6, wherein the plurality of low-level controllers are proportional integral controllers.

8. A control system according to claim 7, wherein the power supply is a series resonant converter.

9. A control system according to claim 1, wherein the at least one sensed state variable is proportional to voltage.

10. A control system according to claim 1, wherein the control action value is proportional to switching frequency of the power supply.

11. A control system for controlling a power supply, comprising:

means for sensing at least one state variable defined for the power supply;

means for generating a fuzzy logic knowledge base having a plurality of fuzzy rules defined for the at least one sensed state variable;

controller means responsive to the at least one sensed state variable for generating a control action value, the controller means including a compiled look-up table of control response action values derived from executing the fuzzy rules in the fuzzy logic knowledge base for the at least one sensed state variable, wherein the compiled look-up table of control action response values obviates a need for subsequent execution of the fuzzy rules, means for producing addresses in the compiled look-up table for the at least one sensed state variable, wherein the addresses point to locations in the compiled look-up table where the control action response values are stored, and means for reading the compiled look-up table corresponding to the produced addresses and outputting the control action response values therefrom; and means for regulating the power supply in accordance with the control action values outputted from the compiled look-up table.

12. A control system according to claim 11, wherein the fuzzy logic knowledge base is generated by a fuzzy logic controller.

13. A control system according to claim 12, wherein the fuzzy logic controller includes means for receiving a plurality of control variable based upon the at least one sensed state variable(s) and means for outputting a control action value based on the plurality of control variables therefrom.

14. A control system according to claim 12, wherein the fuzzy logic controller includes a plurality of low-level controllers, each receiving a plurality of control variables based upon the at least one sensed state variable and outputting a control action value therefrom and a mode selector for blending the control action values from the plurality of low-level controllers into a control action value.

15. A control system for controlling a DC to DC resonant power converter, comprising:

means for sensing a state variable defined for the DC to DC resonant power converter;

means for generating a fuzzy logic knowledge base having a plurality of fuzzy rules defined for the sensed state variable;

a compiled look-up table of control action values derived from executing the fuzzy rules in the fuzzy logic knowledge base for the sensed state variable, wherein the compiled look-up table of control action response values obviates a need for subsequent execution of the fuzzy rules;

means for producing addresses in the compiled look-up table for the sensed state variable, wherein the addresses point to locations in the compiled look-up table where the control action response values are stored;

means for reading the compiled look-up table corresponding to the produced addresses and outputting the control action response values therefrom; and means for regulating the DC to DC resonant power converter in accordance with the control action values outputted from the compiled look-up table, the regulating means regulating output voltage of the DC to DC resonant power converter.

16. A control system according to claim 15, wherein the DC to DC resonant power converter is a is a series resonant converter.

17. A control system according to claim 15, wherein the DC to DC resonant power converter is a single ended parallel multi resonant converter.

18. A method for controlling a power supply in which a sensor means senses at least one state variable defined for the power supply and an actuator means provides a control action to the power supply, comprising the steps of:

generating a fuzzy logic knowledge base having a plurality of fuzzy rules defined for the at least one sensed state variable;

compiling a look-up table of control action response values derived from executing the fuzzy rules in the fuzzy logic knowledge base for the at least one sensed state variable, wherein the compiled look-up table of control action response values obviates a need for subsequent execution of the fuzzy rules;

producing addresses in the compiled look-up table for the at least one sensed state variable, wherein the addresses point to locations in the compiled look-up table where the control action response values are stored; and reading the compiled look-up table in accordance with the produced addresses and outputting the control action response values to the actuator.

19. A method according to claim 18, further comprising the step of regulating the power supply in accordance with the control action outputted to the actuator.

20. A method for controlling a power supply, comprising the steps of:

sensing a state variable defined for the power supply;

compiling a look-up table of control action response values derived from executing a fuzzy logic knowledge base defined for the sensed state variable, the compiling comprising generating a fuzzy logic knowledge base having a plurality of fuzzy rules defined for the sensed state variable and executing the fuzzy rules in the fuzzy logic knowledge base for the sensed state variable, wherein the compiled look-up table of control action response values obviates a need for subsequent execution of the fuzzy rules;

producing addresses in the compiled look-up table for the sensed state variable, wherein the addresses point to locations in the compiled look-up table where the control action response values are stored;

reading the compiled look-up table in accordance with the produced addresses; and outputting the control action response values from the compiled look-up table to the power supply.

21. A method according to claim 20, further comprising the step of regulating the power supply in accordance with the control action.

22. A method for controlling a DC to DC resonant power converter, comprising the steps of:

sensing a state variable defined for the DC to DC resonant power converter;

generating a fuzzy logic knowledge base having a plurality of fuzzy rules defined for the sensed state variable;

executing the plurality of fuzzy rules in the fuzzy logic knowledge base for the sensed state variable;

compiling a look-up table of control action response values derived from the executed fuzzy rules, wherein the compiled look-up table of control action response values obviates a need for subsequent execution of the fuzzy rules;

producing addresses in the compiled look-up table for the sensed state variable in the look-up table, wherein the addresses point to locations in the compiled look-up table where the control action response values are stored;

reading the compiled look-up table in accordance with the produced addresses;

outputting the control action response values from the compiled look-up table; and regulating the DC to DC resonant power converter in accordance with the control action, wherein the output voltage of the DC to DC resonant power converter is regulated.

* * * * *